US011558118B2

(12) United States Patent
Zhou et al.

(10) Patent No.: US 11,558,118 B2
(45) Date of Patent: Jan. 17, 2023

(54) BOARD, OPTICAL MODULE, OLT, AND INFORMATION PROCESSING METHOD

(71) Applicant: HUAWEI TECHNOLOGIES CO., LTD., Shenzhen (CN)

(72) Inventors: Lei Zhou, Shenzhen (CN); Shiwei Nie, Dongguan (CN); Shengping Li, Wuhan (CN); Bo Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/244,298

(22) Filed: Apr. 29, 2021

(65) Prior Publication Data

US 2021/0250096 A1    Aug. 12, 2021

Related U.S. Application Data

(63) Continuation of application No. PCT/CN2018/112890, filed on Oct. 31, 2018.

(51) Int. Cl.
*H04B 10/27* (2013.01)
*H04J 14/00* (2006.01)
*H04L 25/03* (2006.01)

(52) U.S. Cl.
CPC ............ *H04B 10/27* (2013.01); *H04J 14/00* (2013.01); *H04L 25/03878* (2013.01); *H04J 2203/0046* (2013.01); *H04J 2203/0051* (2013.01)

(58) Field of Classification Search
CPC ......... H04B 10/27; H04B 10/40; H04J 14/00; H04J 14/0239
See application file for complete search history.

(56) References Cited

U.S. PATENT DOCUMENTS

| 2011/0150475 | A1* | 6/2011 | Soto | H04B 10/2589 398/63 |
| 2012/0275784 | A1* | 11/2012 | Soto | H04J 14/08 398/67 |
| 2015/0318950 | A1* | 11/2015 | Boyd | H04J 14/0239 398/68 |
| 2016/0066073 | A1* | 3/2016 | Eddleston | H04L 49/208 398/25 |

(Continued)

FOREIGN PATENT DOCUMENTS

| CN | 101674501 A | 3/2010 |
| CN | 102142894 A | 8/2011 |

(Continued)

*Primary Examiner* — Dzung D Tran
(74) *Attorney, Agent, or Firm* — Rimon PC

(57) ABSTRACT

Embodiments of this application disclose a board, an optical module, a MAC chip, a DSP, and an information processing method. The board in the embodiments of this application includes a media access control (MAC) chip, a digital signal processor (DSP), and an equalizer. The MAC chip is configured to send first information to the DSP at an optical network unit (ONU) online stage, where the first information includes a first ONU identifier. The DSP is configured to receive the first information, and determine a first reference equalization parameter, where the first reference equalization parameter is related to the first ONU identifier. The DSP is further configured to set an equalization parameter of the equalizer to the first reference equalization parameter.

20 Claims, 6 Drawing Sheets

(56) References Cited

U.S. PATENT DOCUMENTS

2016/0105253 A1* 4/2016 Liu .................. H04Q 11/0067
398/67
2018/0302164 A1 10/2018 Wu et al.
2018/0302183 A1 10/2018 LIU et al.

FOREIGN PATENT DOCUMENTS

| CN | 106851439 A | 6/2017 |
|---|---|---|
| EP | 2043286 A1 | 4/2009 |
| JP | 2006345131 A | 12/2006 |
| WO | 2011035602 A1 | 3/2011 |
| WO | 2017097008 A1 | 6/2017 |

* cited by examiner

BOARD, OPTICAL MODULE, OLT, AND INFORMATION PROCESSING METHOD

CROSS-REFERENCE TO RELATED APPLICATIONS

This application is a continuation of International Application No. PCT/CN2018/112890, filed on Oct. 31, 2018, the disclosure of which is hereby incorporated by reference in its entirety.

TECHNICAL FIELD

This application relates to the communications field, and in particular, to a board, an optical module, an optical line terminal (OLT), and an information processing method.

BACKGROUND

In a current network structure, a plurality of optical fibers are laid out and new technologies such as dense wavelength division multiplexing (DWDM) are applied to implement deployment of a backbone network. In addition, as broadband access technologies develop and a passive optical network (PON) system proliferates and rapidly expands, a section between the backbone network and a local area network or a home user known as the "last mile" is implemented.

The PON includes an optical line terminal (OLT), an optical distribution network (ODN), and a plurality of optical network units (ONU). The OLT is configured to connect to the backbone network, and the ONU is configured to connect to a regional network or the home user. For example, a common ONU is an optical modem. The OLT communicates with the plurality of ONUs through the ODN. The ODN includes a feeder fiber, an optical splitter, and a distribution fiber that include different passive optical devices. The passive optical devices mainly include a single-mode fiber and an optical cable, an optical fiber ribbon and a ribbon optical cable, an optical connector, a passive optical splitter, a passive optical attenuator and an optical fiber connector, and the like.

When the OLT is connected to the ONU and receives an optical signal sent by the ONU, the OLT cannot immediately obtain effective information from the optical signal, and needs to first perform signal equalization processing on the optical signal using an electrical domain equalization technology, for example, an optical digital signal processing (oDSP) technology. Specifically, the OLT needs to first determine a reference equalization parameter and performs signal equalization processing on the received optical signal through an equalizer by using the reference equalization parameter, to obtain a processed optical signal. Then, the OLT can obtain effective information from the processed optical signal.

Because passive devices and distances between the OLT and different ONUs are different, reference equalization parameters required for optical signals sent by different ONUs are different. Therefore, in the prior art, each time the OLT receives an optical signal sent by an ONU, the OLT may first preset an initial equalization parameter that is usually all 0, and then perform iterative convergence on the preset initial equalization parameter using the optical signal, to obtain a corresponding reference equalization parameter. Finally, the OLT performs signal equalization processing on the optical signal using the reference equalization parameter, to obtain an optical signal from which the OLT can obtain effective information. However, the iterative convergence requires a period of time. The OLT can perform, only after the period of time, signal equalization processing on the optical signal to obtain the processed optical signal, and obtains effective information from the processed optical signal. This causes a relatively long delay.

SUMMARY

Embodiments of this application provide a board, an optical module, an OLT, and an information processing method, to quickly set an equalization parameter of an equalizer for an ONU at an ONU online stage and reduce a delay.

A first aspect of this application provides a board. The board includes a MAC chip, a DSP, and an equalizer.

The MAC chip sends first information to the DSP at an ONU online stage, where the first information includes a first ONU identifier. The DSP receives the first information, and determines a first reference equalization parameter, where the first reference equalization parameter is related to the first ONU identifier. The DSP sets an equalization parameter of the equalizer to the first reference equalization parameter.

In this application, the MAC chip may send the first information to the DSP, where the first information includes the first ONU identifier. The DSP may determine the related first reference equalization parameter based on the first ONU identifier, and set the equalization parameter of the equalizer to the first reference equalization parameter. Reconvergence does not need to be performed. This saves time and reduces a delay.

In some embodiments of this application, an OLT may periodically "open a window" to register an ONU that newly goes online. After the OLT "closes the window", an ONU online stage starts. At the ONU online stage, the MAC chip is configured to serve an online ONU. It should be noted that the ONU that newly goes online may be used as the online ONU at the ONU online stage to receive a service from the board (including the MAC chip, an optical module, and the like, which is not limited herein).

In some feasible implementations, the first information includes an information field, and the information field includes the first ONU identifier, to determine a manner of carrying the first ONU identifier. In some feasible embodiments, the information field may further include a check field. A check bit, also referred to as a parity bit (parity bit), is a binary number indicating whether a quantity of is in a binary number with a given quantity of bits is an odd number or an even number, and is a simplest error detection code. Details are not described herein. For example, the information field may be information including 10 bits (including the check bit) of the first ONU identifier and the check bit, and the first ONU identifier may be one of 110110111, 101101110, or 110111011.

In some feasible implementations, the DSP is specifically configured to: after receiving the first information, obtain the first ONU identifier from the first information, and before an upstream optical signal corresponding to the first ONU identifier arrives, set the equalization parameter of the equalizer to the first reference equalization parameter. The DSP may send a reset signal to a TIA, so that the optical module receives an optical signal through the TIA within a first upstream transmission time. The DSP can set the first reference equalization parameter after receiving the first information, and does not need to store the first reference equalization parameter, to minimize storage load of the DSP.

In some feasible implementations, the first information includes an information field. The information field includes at least one piece of time sequence information. The at least one piece of time sequence information includes first time sequence information, and the first time sequence information is used to indicate a correspondence between the first ONU identifier and a first upstream transmission time. The DSP is specifically configured to determine the first reference equalization parameter corresponding to the first ONU identifier, and set the equalization parameter of the equalizer to the first reference equalization parameter before the first upstream transmission time. Reconvergence does not need to be performed to determine the first reference equalization parameter. This saves time and reduces a delay. In some feasible embodiments, the first upstream transmission time is a time within which an ONU indicated by the first ONU identifier sends an optical signal to the OLT. It should be noted that the first upstream transmission time may be a time point or a time period. This is not limited herein. In this manner, after receiving the first information, the DSP obtains the first upstream transmission time corresponding to the first ONU identifier, and does not immediately set the equalization parameter of the equalizer, but sets the equalization parameter of the equalizer to the first reference equalization parameter before the first upstream transmission time, so that the optical signal is received. Because the MAC chip does not need to temporarily send an indication to set a reference equalization parameter, and may indicate, to the DSP in advance, a time for setting each reference equalization parameter, the MAC chip can arrange a working thread more freely.

In some feasible implementations, the first information further includes a demarcation field, a start field, and an end field, where the demarcation field is used to be identified by the DSP. In some embodiments of this application, content of the demarcation field may be agreed on in advance. The demarcation field may be information of three bits, for example, 010, 110, 101, 111, or 001, or may be information of four or more bits. This is not limited herein. 010 is used as an example. The DSP may continuously search for the signal 010, and when 010 is found, the DSP determines that 010 is a demarcation field, and determines that a frame including the demarcation field carries the first information. In this case, the DSP may obtain the first ONU identifier from the frame. In some feasible embodiments, the demarcation field may alternatively be a field of four bits or another quantity of bits. This is not limited herein. When identifying the demarcation field, the DSP may determine that a frame in which the demarcation field is located carries the first information, and may obtain the first ONU identifier from the frame.

In some feasible embodiments, the start field is used to indicate that the information field starts, and the end field is used to indicate that the information field ends. In some feasible embodiments, the start field is information of four bits (or another quantity of bits, which is not limited herein), for example, 1111 (or 0000, which is not limited herein). The end field may be information of four bits (or another quantity of bits, which is not limited herein), for example, 0000 (or 1111, which is not limited herein). In some feasible embodiments, the first information may alternatively include a plurality of frames. The plurality of frames have same functions as the demarcation field, the start field, the information field, and the end field have. This is not limited herein.

In some feasible implementations, the board further includes a rate selection RATE_SEL pin. The RATE_SEL pin is connected to the MAC chip and the DSP. The RATE_SEL pin may be used by the MAC chip to send rate information to the DSP, and send the first information to the DSP at the ONU online stage. Therefore, a pin used by the MAC chip to send the first information to the DSP is determined.

In some feasible implementations, the board further includes a transimpedance amplifier TIA. The DSP is connected to the TIA, and the DSP is further configured to send a reset signal to the TIA. In some feasible implementations, there are at least two TIAs, and the TIAs include a 50G passive optical network PON TIA and a 10G PON TIA. Therefore, the MAC chip does not need to send a reset signal to the DSP through two reset pins. In this way, the two reset pins are vacated for another purpose.

In some feasible implementations, the first information further includes a rate field. The rate field is used to indicate whether to send the reset signal to the 50G PON TIA or the 10G PON TIA, so that the DSP determines a TIA to which the reset signal is to be sent. It should be noted that the rate field may have only one bit, for example, 0 or 1. For example, 0 may indicate that a rate of the ONU is 10 Gb/s, and 1 may indicate that the rate of the ONU is 50 Gb/s; or 1 may indicate that a rate of the ONU is 10 Gb/s, and 0 may indicate that the rate of the ONU is 50 Gb/s. This is not limited herein. The rate field is used to indicate the rate (for example, 10 Gb/s or 50 Gb/s) of the ONU indicated by the first ONU identifier, so that the DSP can determine whether to reset the 10G PON TIA or the 50G PON TIA.

In some feasible implementations, the board further includes two reset pins. The DSP may send the reset signal to a corresponding TIA. The reset signal does not need to be sent through the two reset pins. The rate field is sent to the DSP through the RATE_SEL pin, and the DSP can send the reset signal to a correct TIA based on the rate field. In this way, the two reset pins originally used to transmit the reset signal are vacated. The MAC chip sends two differential clock signals to the DSP through the two reset pins, so that a pin does not need to be added to the board, and the board does not need to connect to an external clock chip. This implements time synchronization of each component in the OLT.

In some feasible implementations, the equalizer performs convergence at an ONU registration stage to obtain the first reference equalization parameter. In some embodiments of this application, the equalizer in the optical module may perform convergence on a preset initial equalization parameter by using a registration optical signal, to obtain the first reference equalization parameter. The first reference equalization parameter is used to perform signal equalization processing on the registration optical signal. In some feasible embodiments, the preset initial equalization parameter may be set to a random array or a fixed array, for example, an array (0, 0, 0, . . . , 0) that is all 0. This is not limited herein. The MAC chip is further configured to allocate, at the ONU registration stage, the first ONU identifier to the ONU that newly goes online, and send the first ONU identifier to the DSP. The DSP stores a correspondence between the first ONU identifier and the first reference equalization parameter.

In some feasible implementations, the DSP is further configured to store a correspondence group. The correspondence group includes at least the correspondence between the first ONU identifier and the first reference equalization parameter. In some embodiments of this application, after receiving the first ONU identifier, the DSP may obtain the first reference equalization parameter from the equalizer, and then store the correspondence between the first reference equalization parameter (for example, (Cp0, Cp1, Cp2, . . . , Cpn)) and the first ONU identifier (for example, 110110111). In some feasible embodiments, the correspondence may be stored in a configuration table. In some feasible embodiments, the DSP may further store a plurality of correspondences, referred to as the correspondence group herein. The correspondence group includes at least the correspondence between the first ONU identifier and the first reference equalization parameter. In some feasible embodiments, the correspondence group may be stored in the configuration table.

In some implementations, that the DSP determines the first reference equalization parameter includes: the DSP searches the correspondence group for the first reference equalization parameter corresponding to the first ONU identifier. The first ONU identifier and the first reference equalization parameter are paired for storage, so that the DSP can determine the first reference equalization parameter after receiving the first information sent by the MAC chip. This implements fast convergence.

In some feasible implementations, after the DSP sets the equalization parameter of the equalizer to the first reference equalization parameter, the equalizer is further configured to perform convergence on the first reference equalization parameter to obtain a second reference equalization parameter. The DSP is further configured to set the equalization parameter of the equalizer to the second reference equalization parameter. An appropriate equalization parameter is related to a network status, and the network status may not change much in a short period of time. Therefore, the first reference equalization parameter is very close to the second reference equalization parameter. In comparison with convergence performed on the preset initial equalization parameter, the appropriate equalization parameter is more quickly obtained through convergence performed on the first reference equalization parameter. This improves convergence efficiency and saves time.

In some feasible implementations, the board further includes the optical module. The DSP and the equalizer are integrated in the optical module; or the DSP is integrated with the MAC chip; or the equalizer is integrated in the DSP, and the DSP is integrated in the optical module. The board can be formed in different manners to adapt to different scenarios.

A second aspect of this application provides an optical module, including a DSP and an equalizer. When a MAC chip sends first information to the DSP at an ONU online stage, the DSP receives the first information, determines a first reference equalization parameter, and sets an equalization parameter of the equalizer to the first reference equalization parameter. The first information includes a first ONU identifier, and the first reference equalization parameter is related to the first ONU identifier.

In some feasible implementations, the DSP in the optical module according to the second aspect of this application is configured to perform a same function as the DSP in the implementations of the board according to the first aspect of this application performs. The equalizer in the optical module according to the second aspect of this application is configured to perform a same function as the equalizer in the implementations of the board according to the first aspect of this application performs. Details are not described herein again.

A third aspect of this application provides a MAC chip. The MAC chip is configured to send first information to a DSP at an ONU online stage, where the first information includes a first ONU identifier. The DSP receives the first information, determines a first reference equalization parameter, and sets an equalization parameter of an equalizer to the first reference equalization parameter. The first reference equalization parameter is related to the first ONU identifier.

In some feasible implementations, the MAC chip according to the third aspect of this application is configured to perform a same function as the MAC chip in the implementations of the board according to the first aspect of this application performs. Details are not described herein again.

A fourth aspect of this application provides a DSP. The DSP is configured to: when a MAC chip sends first information to the DSP at an ONU online stage, receive the first information, determine a first reference equalization parameter, and set an equalization parameter of an equalizer to the first reference equalization parameter. The first information includes a first ONU identifier, and the first reference equalization parameter is related to the first ONU identifier.

In some feasible implementations, the DSP according to the fourth aspect of this application is configured to perform a same function as the DSP in the implementations of the board according to the first aspect or the optical module according to the second aspect of this application performs. Details are not described herein again.

A fifth aspect of this application provides an OLT, including a board. The board includes a MAC chip, a DSP, and an equalizer. The MAC chip is configured to send first information to the DSP at an ONU online stage, where the first information includes a first ONU identifier. The DSP is configured to receive the first information, and determine a first reference equalization parameter, where the first reference equalization parameter is related to the first ONU identifier. The DSP is further configured to set an equalization parameter of the equalizer to the first reference equalization parameter.

In some feasible implementations, the board is configured to perform a same function as the board in the implementations of the board according to the first aspect of this application performs. Details are not described herein again.

A sixth aspect of this application provides an information processing method, including:

A MAC chip sends first information to a DSP at an ONU online stage, where the first information includes a first ONU identifier. The DSP receives the first information, and determines a first reference equalization parameter, where the first reference equalization parameter is related to the first ONU identifier. The DSP sets an equalization parameter of an equalizer to the first reference equalization parameter.

In some feasible implementations, the method steps implemented by the components according to the foregoing aspects are further performed in the method. Details are not described herein again.

A seventh aspect of this application provides a computer-readable storage medium. The computer-readable storage medium stores an instruction. When the instruction is run on a computer, the computer is enabled to perform the method according to the foregoing aspect.

In this application, the MAC chip may send the first information to the DSP, where the first information includes the first ONU identifier. The DSP may determine the related first reference equalization parameter based on the first ONU identifier, and set the equalization parameter of the equalizer to the first reference equalization parameter. Reconvergence does not need to be performed. This saves time and reduces a delay.

BRIEF DESCRIPTION OF DRAWINGS

FIG. 1-2 is a schematic diagram of an embodiment of an architecture of a PON;

FIG. 1-3 is a front view of an OLT;

FIG. 1-4 is a schematic diagram of an internal architecture of a board;

FIG. 1-5 is a schematic diagram of another embodiment of an architecture of a board;

FIG. 2-1 is a schematic diagram of an embodiment of an information processing method;

FIG. 2-2 is a schematic diagram of composition of a time sequence information frame; and FIG. 3 is a schematic diagram of another embodiment of an information processing method.

DESCRIPTION OF EMBODIMENTS

The following describes the technical solutions in the embodiments of this application with reference to the accompanying drawings in the embodiments of this application. It is clear that the described embodiments are merely some but not all of the embodiments of this application.

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way are interchangeable in proper circumstances, so that the embodiments described herein can be implemented in an order other than the order illustrated or described herein. Moreover, the terms "include", "contain", and any other variants mean to cover the non-exclusive inclusion, for example, a process, method, system, product, or device that includes a list of steps or units is not necessarily limited to those units, but may include other units not expressly listed or inherent to such a process, method, system, product, or device.

Figure 1:
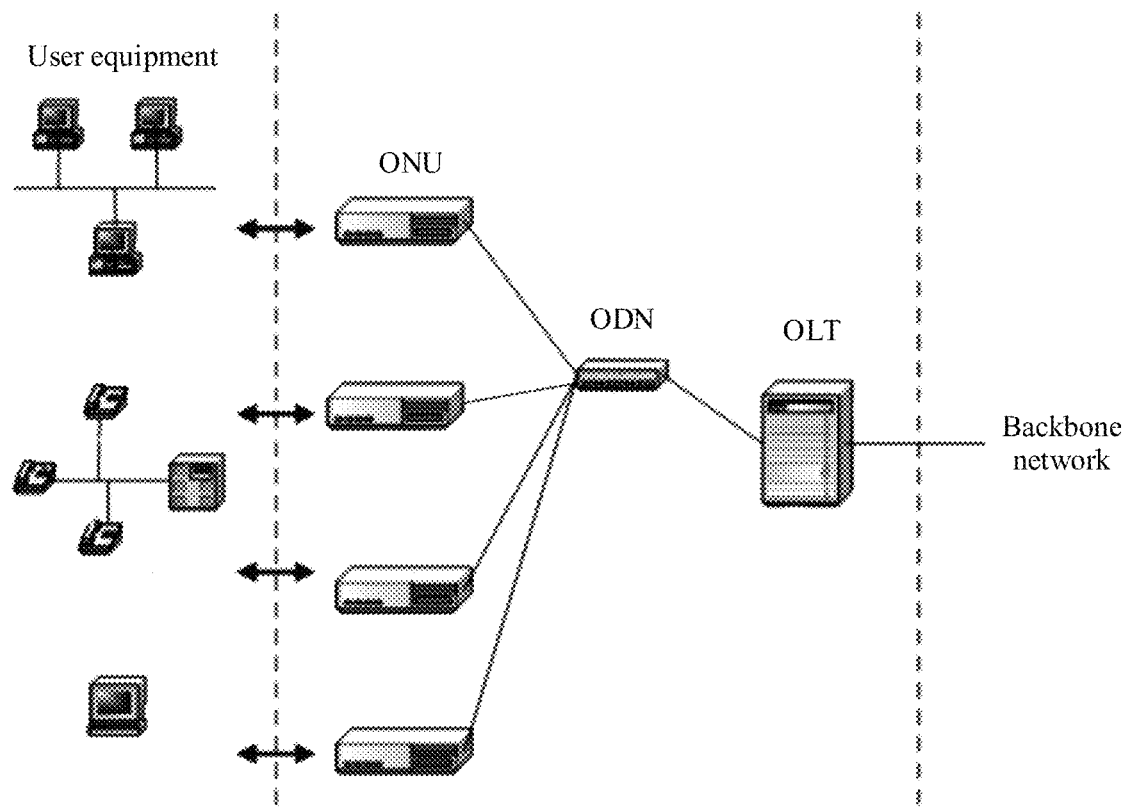
FIG. 1-1 is a schematic diagram of a location of a PON in a network structure.

In a current network structure, a backbone network is often deployed. As a PON proliferates and rapidly expands, a section between the backbone network and a local area network or a home user is implemented. FIG. 1-1 is a schematic diagram of a location of a PON in a network structure. An OLT in the figure is connected to a backbone network, and may provide services for a plurality of ONUs through an ODN. One ONU may serve a plurality of user equipment, such as a mobile phone and a computer. This is not limited herein.

Figures 1, 2:
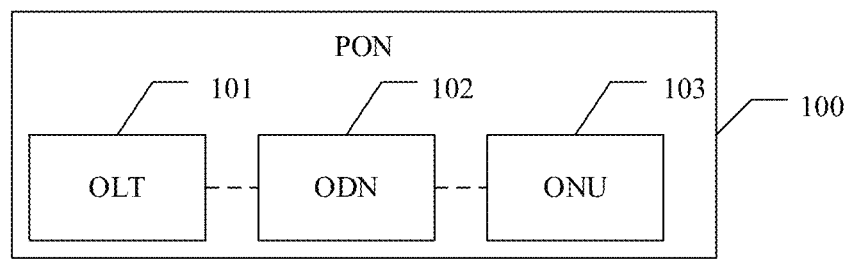

FIG. 1-2 is a schematic diagram of an embodiment of an architecture of a PON 100. The PON 100 includes an OLT 101, an ODN 102, and an ONU 103. The OLT 101 is configured to connect to a backbone network, and the ONU 103 is configured to connect to a local area network or a home user. The OLT 101 and the ONU 103 are connected through the ODN 102 to implement communication.

In the embodiments of this application, the OLT 101 is a core component in the PON 100. The OLT 101 is usually placed in a central office and provides an optical fiber interface of the passive optical network for a user. It should be noted that the OLT 101 is mainly configured to implement upstream connection to an upper-layer network, complete upstream access of the PON 100, and connect to customer-premises equipment, namely, the ONU 103, through the ODN 102, to implement functions of controlling, managing, and registering equipment on customer-premises, namely, the ONU 103.

In some embodiments of this application, the ONU 103 is customer-premise equipment in the PON 100, and is placed on customer premises and connected to the OLT 101. The ONU 103 is mainly configured to receive data sent by the OLT 101, respond to a management command sent by the OLT 101 and perform corresponding adjustment, buffer Ethernet data of a user, and perform sending to an upstream direction and another user management function in a transmit window allocated by the OLT 101, to provide the user with services such as voice, data, and multimedia.

In some embodiments of this application, the ODN 102 includes a passive optical device. The passive optical device is also referred to as an "optical passive device". The passive optical device is a device that does not perform optical-to-electrical energy conversion in a process of implementing functions of the passive optical device during fiber-optic communication, and includes components such as an optical fiber connector (optical fiber connector), an optical directional coupler (optical directional coupler), an optical isolator (optical isolator), or an optical attenuator (optical attenuator). The passive optical device is used for optical fiber connection, optical power allocation, optical signal attenuation, optical wavelength division multiplexing, and the like in a system of the PON 100, and features a high return loss, a low insertion loss, high reliability, stability, mechanical abrasion resistance, corrosion resistance, easy operation, and the like. Passive optical devices are widely used in long-range communication, a regional network and fiber to home, video transmission, optical fiber sensing, and the like. The passive optical device is an important part of the system of the PON 100, and is also an indispensable device in an optical fiber application field.

When the OLT 101 is connected to the ONU 103 through the ODN 102, and receives an optical signal sent by the ONU 103, the OLT 101 cannot immediately obtain effective information from the optical signal. Instead, the OLT 101 needs to first perform signal equalization processing on the optical signal by using a signal equalization technology, and convert the optical signal into an electrical signal, to obtain effective information from the electrical signal. Previously, the OLT 101 needs to first determine an equalization parameter of an equalizer, performs signal equalization processing on the received optical signal through the equalizer by using the equalization parameter, to obtain a processed optical signal, and converts the processed optical signal into an electrical signal, to obtain effective information from the electrical signal.

Figures 1, 2, 3:
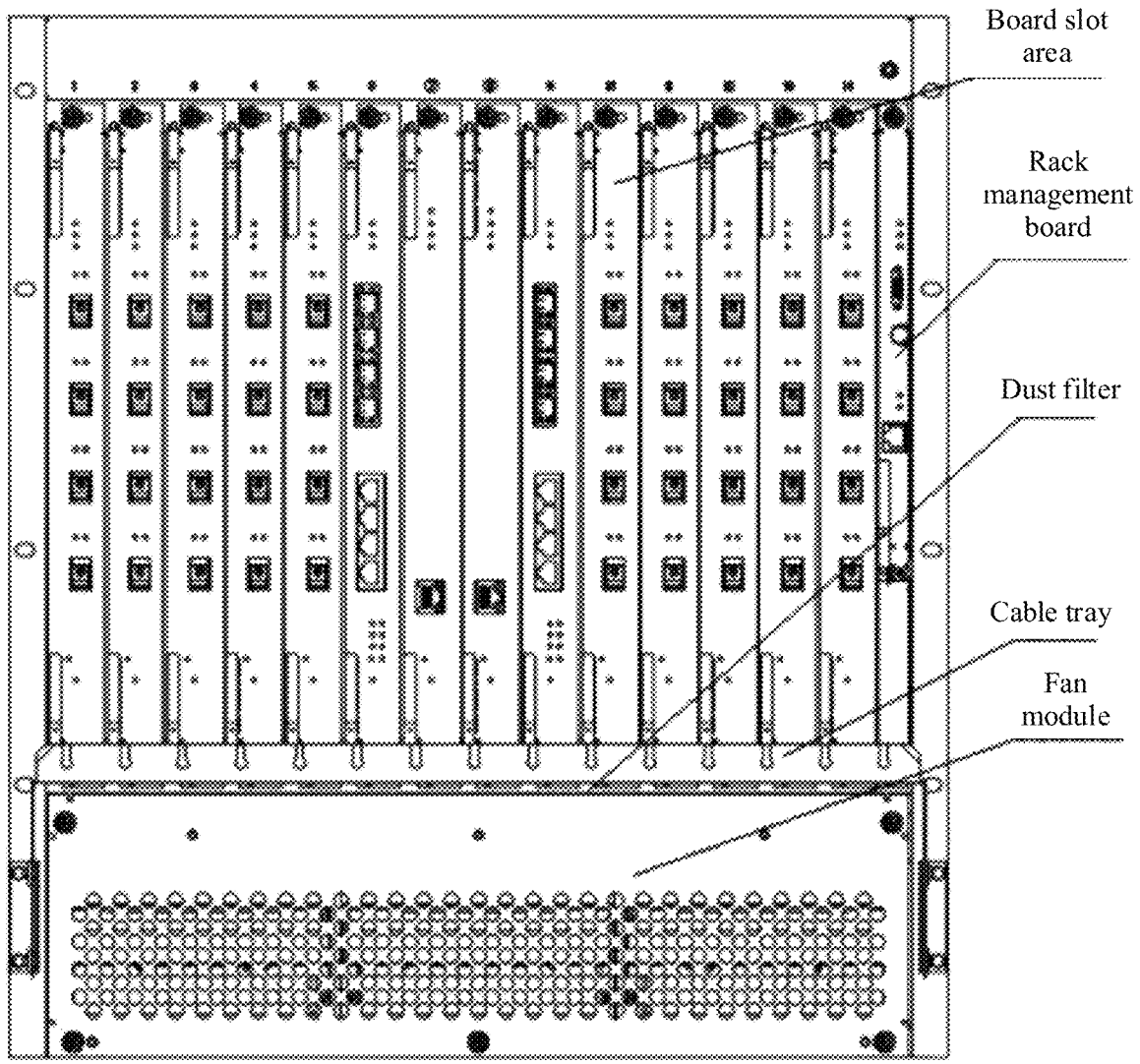
Figures 1, 2, 3, 4:
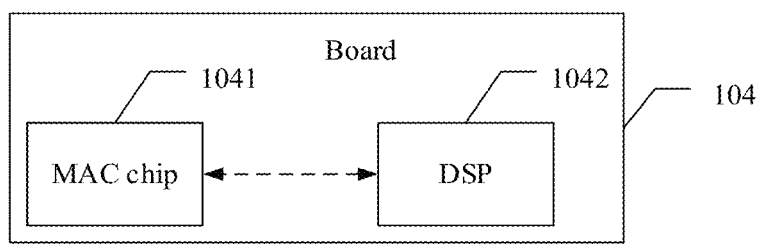
Figures 1, 2, 3, 4, 5:
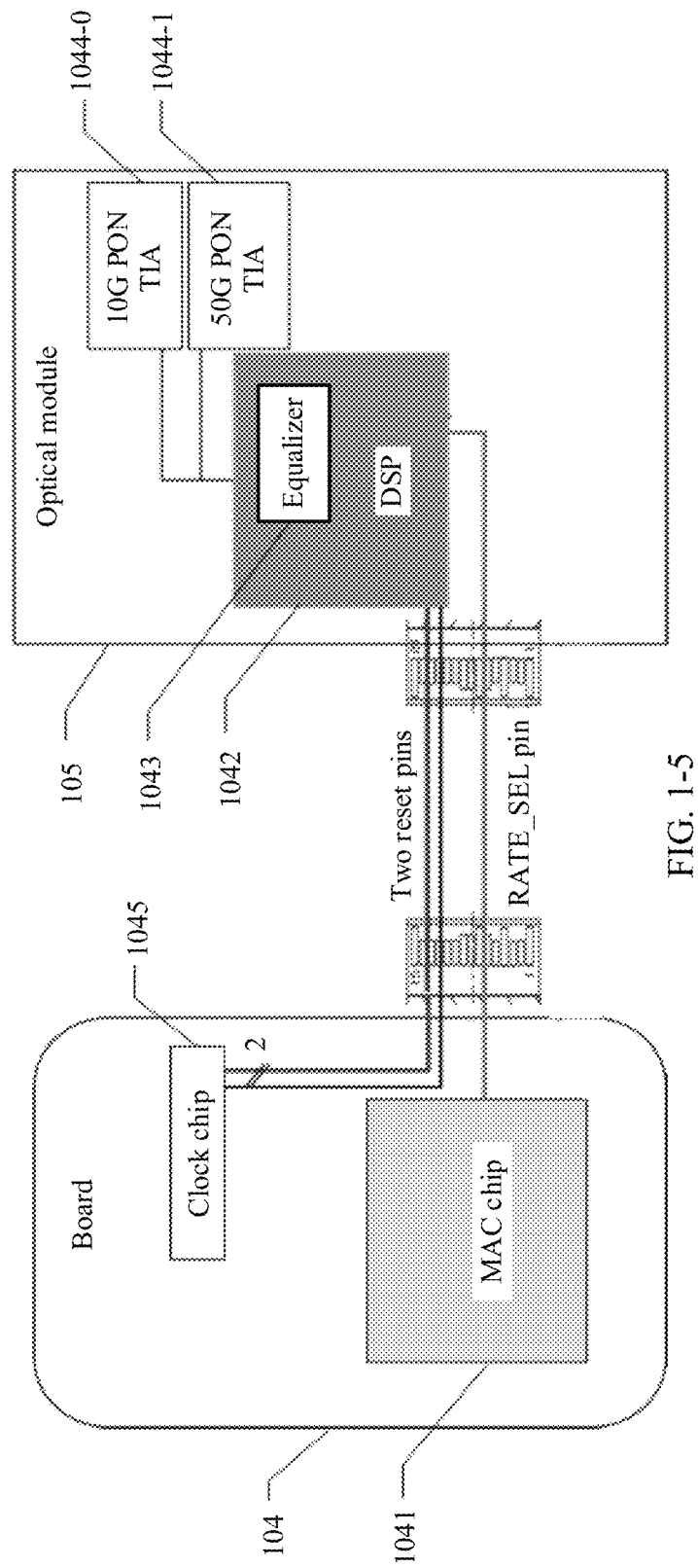
Figures 1, 2:
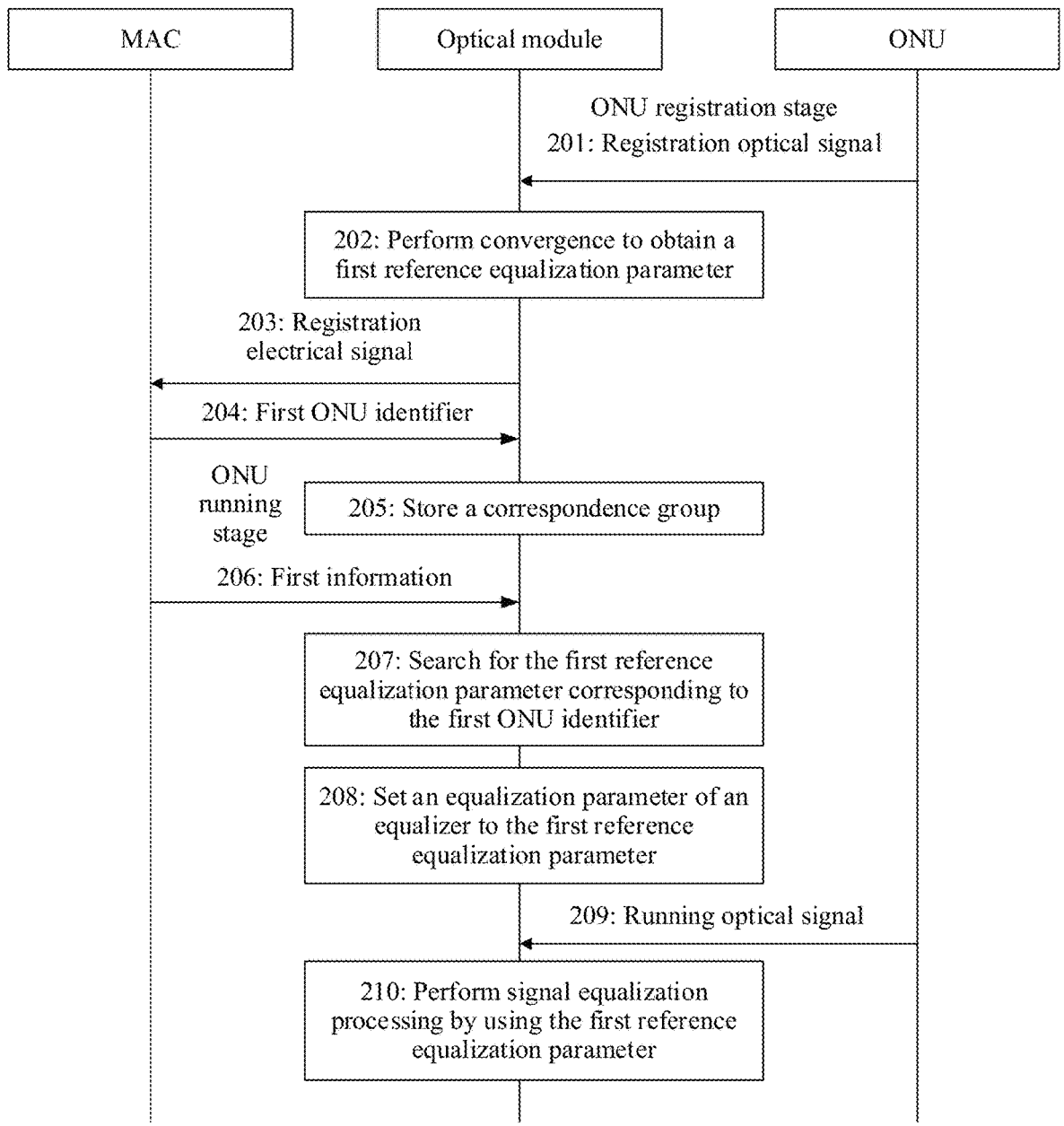
Figure 2:
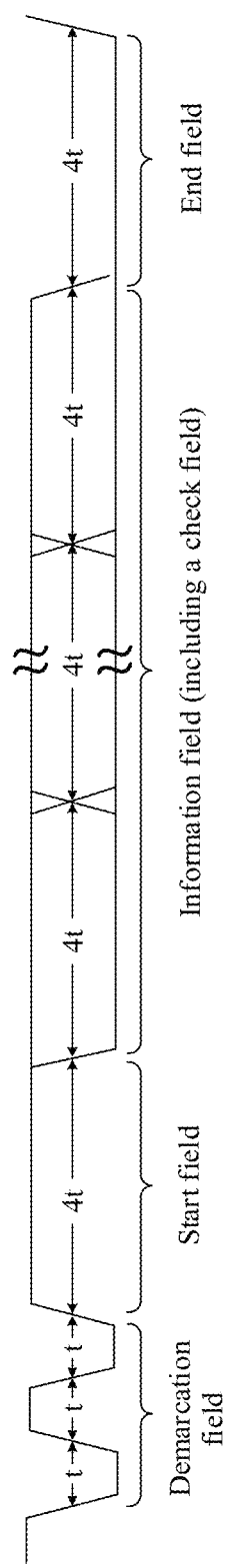
Figure 3:
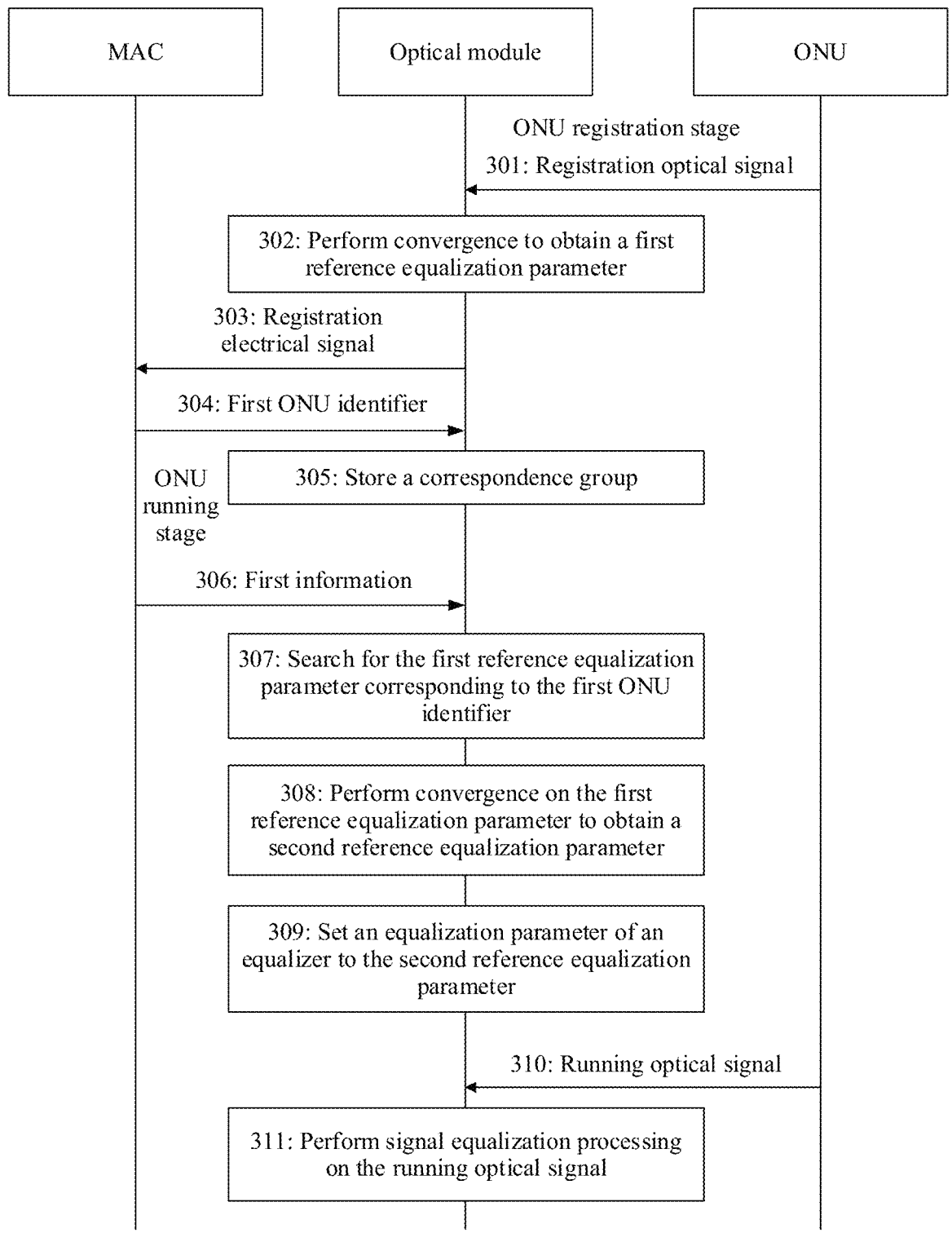

In some feasible embodiments, the OLT 101 may be shown in FIG. 1-3 (which is a front view of the OLT). The OLT 101 may include a plurality of boards. The plurality of boards include a service board, a main control board, a management board, and the like. The OLT 101 may further include a dust filter, a cable tray, a fan module, and the like. This is not limited herein. For example, the board is a service board. One board may have a board slot area. The board slot area may include a plurality of slots, and each slot may be provided to an optical module for insertion.

In the embodiments of this application, an information exchange process of an internal component in the OLT is improved, to implement the foregoing method and effect. The following describes an internal architecture of a board. Referring to FIG. 1-4 (which is a schematic diagram of an internal architecture of a board 104), the board 104 may include a media access control (MAC) chip 1041 and a digital signal processor (DSP) 1042.

It should be noted that the MAC chip 1041 may control access of a node to a physical layer by using a MAC protocol. In the embodiments of this application, the DSP 1042 may perform optical-to-electrical conversion on a received optical signal. Specifically, the DSP 1042 may implement optical-to-electrical conversion through a chip that can implement a digital signal processing technology. To be specific, an electrical signal is converted into an optical signal at a transmit end, and an optical signal is converted into an electrical signal at a receive end. This is not limited herein.

In some feasible embodiments, the board may further include an equalizer and an optical module. The DSP and the equalizer are integrated in the optical module; or the DSP is integrated with the MAC chip; or the equalizer is integrated in the DSP, and the DSP is integrated in the optical module. This is not limited herein.

In some feasible embodiments, the optical module may be integrated in the board, or may be used as an external device of the board. This is not limited herein. When the optical module is used as the external device of the board, the optical module includes the DSP and the equalizer. The optical module is inserted into the board, and exchanges information with the MAC chip of the board through a plurality of pins in an insertion port, to receive power provided by the board, and convert an electrical signal transmitted by the board into an optical signal, or convert a received optical signal into an electrical signal and send the electrical signal to the board, to implement optical-to-electrical conversion. The plurality of pins include two reset pins and one RATE_SEL pin.

The following provides description by using an example. As shown in FIG. 1-5 (which is a schematic diagram of another embodiment of an architecture of a board), an example in which the DSP 1042 is integrated in an optical module 105, the MAC chip 1041 is located in the board 104, and the optical module 105 is an external device of the board 104 and is inserted into the board 104 is used for description.

In the embodiments of this application, the optical module 105 further includes an equalizer 1043. The equalizer 1043 is configured to perform signal equalization processing on a received optical signal. The equalizer 1043 is a component configured to correct an amplitude/frequency characteristic and a phase/frequency characteristic of a transmission channel. In some feasible embodiments, the equalizer 1043 may be a digital equalizer 1043 or an analog equalizer 1043. This is not limited herein. It should be noted that the equalizer 1043 may be integrated in the DSP 1042, or may be an independent module. This is not limited herein.

In the embodiments of this application, the optical module 105 further includes at least one TIA. When the optical module 105 includes two or more TIAs, the optical module 105 is an integrated optical module 105. As shown in FIG. 1-5, the optical module 105 includes two TIAs: a 10G PON TIA 1044-0 and a 50G PON TIA 1044-1. The 10G PON TIA 1044-0 corresponds to a 10G PON system with an upstream/downstream rate of 10 Gb/s, and the 50G PON TIA 1044-1 corresponds to a 50G PON system with an upstream/downstream rate of 50 Gb/s. In this case, the optical module 105 can receive and process an optical signal sent by an ONU with a rate of 10 Gb/s or 50 Gb/s.

In the prior art, the MAC chip 1041 sends a reset signal to a corresponding TIA through one of two reset pins (each of which is used to send the reset signal to the 10G PON TIA 1044-0 or the 50G PON TIA 1044-1), so that the corresponding TIA can receive an optical signal. In the embodiments of this application, information exchange between the MAC chip 1041 and the DSP 1042 is improved, and the MAC chip 1041 does not need to send a reset signal to the DSP 1042 through the two reset pins. In this way, the two reset pins are vacated for another purpose.

For example, in some feasible embodiments, a clock chip 1045 may be built in the board 104, and sends two differential clock signals to the DSP 1042 through the two vacated reset pins. It should be noted that a clock signal is generated by a clock generator, has a fixed clock frequency, is usually used in a synchronization circuit to determine when to update a status in a logic unit, and is a semaphore that has a fixed cycle and is unrelated to running, and therefore plays a timer role, to ensure that related electronic components can synchronously operate. The clock generator generates a clock through an oscillator that can provide square wave output. An oscillator circuit always uses a feedback loop to make the oscillator oscillate, and enables the oscillator to operate at a specific frequency by feeding back a corresponding parameter. In the embodiments of this application, two differential clock signals are transmitted through the two reset pins in a differential transmission mode, to ensure that the MAC chip 1041 and the DSP 1042 synchronously operate. In some feasible embodiments, the clock chip 1045 may alternatively be integrated in the MAC chip 1041. This is not limited herein.

In the prior art, because passive devices and distances between different ONUs and an OLT are different, equalization parameters required for optical signals sent by different ONUs are different. Therefore, in the prior art, each time the OLT receives an optical signal sent by an ONU, the OLT first sets a preset initial equalization parameter that is usually (0, 0, . . . , 0), and then performs convergence on the preset initial equalization parameter by using the optical signal sent by the ONU to obtain a corresponding reference equalization parameter, performs signal equalization processing on the received optical signal by using the reference equalization parameter, and converts a processed optical signal into an electrical signal, to obtain an electrical signal from which the OLT can obtain effective information. However, it usually takes some time to perform convergence on the preset initial equalization parameter to obtain the reference equalization parameter. This causes a relatively long delay in a process in which the ONU receives a service from the OLT.

In some embodiments of this application, a MAC chip may send first information to a DSP, where the first information includes a first ONU identifier. The DSP may determine a related first reference equalization parameter based on the first ONU identifier, and set an equalization parameter of an equalizer to the first reference equalization parameter. Reconvergence does not need to be performed. This saves time and reduces a delay.

Therefore, the following describes an example information exchange process of each internal component of the board in the embodiments of this application. Specifically, two embodiments may be used for description based on different equalization parameter settings.

1. Set an equalization parameter of an equalizer to a first reference equalization parameter.

Referring to FIG. 2-1, an embodiment of this application further provides an information processing method, including the following steps.

201: An optical module detects a registration optical signal at an ONU registration stage.

In some embodiments of this application, an OLT periodically opens a window to enter the ONU registration stage. At the ONU registration stage, an already online ONU temporarily stops sending an optical signal, but an ONU that newly goes online sends an optical signal. Alternatively, the optical module temporarily stops receiving optical signals sent by an online ONU, but monitors optical signals sent by an ONU that newly goes online. In some embodiments of this application, because an optical signal is used to register the ONU, the optical signal is referred to as the registration optical signal. When the optical module detects the registration optical signal, a DSP sends a reset signal to a TIA, so that the TIA receives the registration optical signal.

It should be noted that during the operation of an electronic device such as a programmable chip (for example, a single-chip microcomputer), a programmable controller, or a microcomputer, a software program may run abnormally or jump to another program. In this case, a signal may be manually or automatically sent to a specific hardware interface, so that the running of software is restored to the running of a specific program segment. This process is a reset process. In this process, the signal manually or automatically sent to the specific hardware interface is the reset signal.

202: The equalizer performs convergence at the ONU registration stage to obtain the first reference equalization parameter.

In some embodiments of this application, after the TIA receives the registration optical signal, the DSP cannot directly convert the registration optical signal into an electrical signal. Instead, the DSP needs to first perform signal equalization processing on the registration optical signal to obtain a processed registration optical signal, and then it can convert the processed registration optical signal into an electrical signal. It should be noted that, to perform signal equalization processing on the optical signal, a reference equalization parameter of the equalizer needs to be determined. The reference equalization parameter is used to perform signal equalization processing on the optical signal.

It should be noted that on a bandwidth-limited channel during communication, inter-symbol interference due to multipath impact may distort a transmitted signal, so that a bit error occurs during reception. The inter-symbol interference is a main obstacle to high-speed data transmission on a mobile wireless communication channel. Therefore, the equalizer at a receive end can cancel, by generating a characteristic opposite to that of the channel, the inter-symbol interference caused by a time-varying multipath propagation characteristic of the channel. "Equalization" implemented by the equalizer is an effective means to deal with the inter-symbol interference. Randomness and a time-varying characteristic of a mobile fading channel require that the equalizer can track the time-varying characteristic of a mobile communication channel in real time, and the equalizer is also referred to as an "adaptive equalizer".

In some embodiments of this application, the equalizer performs convergence at the ONU registration stage by using a signal equalization technology, to obtain the first reference equalization parameter. It should be noted that the equalization technology is to insert a tunable filter in a digital communications system to correct and compensate for a system characteristic and reduce impact of the inter-symbol interference. The equalizer is usually implemented by a filter, and the filter is used to compensate for a distorted pulse. A demodulation output sample obtained by a decision device is a sample that is corrected by the equalizer or obtained after the inter-symbol interference is cleared. The equalizer continuously adjusts, based on a specific algorithm, a gain directly from an actual transmitted digital signal, therefore can adapt to a random change of the channel and maintain an optimal state, to have better distortion compensation performance.

The equalizer usually has two working modes: a training mode and a tracking mode. The training mode is used as an example. First, a transmitter transmits a known fixed-length training sequence, so that the equalizer at a receiver can make a correct setting. A typical training sequence is a binary pseudo-random signal or a string of pre-specified data bits, and user data is transmitted immediately after the training sequence is sent. The equalizer at the receiver evaluates a channel characteristic through a recursive algorithm and corrects a filter coefficient to compensate the channel. When the training sequence is designed, the equalizer needs to be capable of obtaining a correct filtering coefficient based on the training sequence even under a worst channel condition. In this way, after the training sequence is received, a filtering coefficient of the equalizer is close to an optimal value. When data is received, an adaptive algorithm of the equalizer can track a changing channel, and the adaptive equalizer continuously changes a filtering characteristic of the adaptive equalizer.

It should be noted that an entire process from adjusting a parameter to forming convergence by the equalizer is a function of an equalizer algorithm, a structure, and a communication change rate. The equalizer needs to be trained periodically and repeatedly to effectively eliminate the inter-symbol interference. In the digital communications system, user data is divided into segments, and the data segments are transmitted in corresponding time periods. Each time a new data segment is received, the equalizer uses a same training sequence to perform correction. The equalizer is usually implemented in a baseband part or an intermediate frequency part of the receiver, and a complex expression of a baseband envelope may describe a waveform of a band-pass signal. Therefore, a channel response, a demodulation signal, and an adaptive algorithm may be usually simulated and implemented in the baseband part.

In some embodiments of this application, the equalizer in the optical module may perform convergence on a preset initial equalization parameter by using the registration optical signal, to obtain the first reference equalization parameter. The first reference equalization parameter is used to perform signal equalization processing on the registration optical signal. In some feasible embodiments, the preset initial equalization parameter may be set to a random array or a fixed array, for example, an array (0, 0, 0, . . . , 0) that is all 0. This is not limited herein.

In some embodiments of this application, if an initial equalization array is (C00, C01, C02, . . . , C0n), a target is to calculate an array whose mean squared error is less than a preset value. After one iteration, an array (C10, C11, C12, . . . , C1n) may be obtained, and a mean squared error of the array is calculated. If the mean squared error is greater than the preset value, the iteration continues. After m iterations, an array (Cm0, Cm1, Cm2, . . . , Cmn) is obtained, and a mean squared error of the array is calculated. If the mean squared error is greater than the preset value, the iteration continues. After p iterations, an array (Cp0, Cp1, Cp2, . . . , Cpn) is obtained, and a mean squared error of the array is calculated. If the mean square error is less than the preset value, the array (Cp0, Cp1, Cp2, . . . , Cpn) is used as the first reference equalization parameter. In some feasible embodiments, it is insufficient that a mean squared error of an array is less than the preset value after only one calculation. It is required that a mean squared error of an array is less than the preset value after a plurality of consecutive calculations, for example, 500 (which may alternatively be 1000 or another value, and is not limited herein) calculations. During 500 iterations, if the mean squared error is less than the preset value, it is determined that an array obtained after a $500^{th}$ iteration is used as the first reference equalization parameter.

203: Send a registration electrical signal to a MAC chip.

In some embodiments of this application, after the equalizer performs convergence to obtain the first reference equalization parameter, the DSP obtains the first reference equalization parameter from the equalizer, and sets the equalization parameter of the equalizer to the first reference equalization parameter, to perform signal equalization processing on the registration optical signal to obtain the processed registration optical signal. The MAC chip cannot process an optical signal but can process only an electrical signal. Therefore, the DSP needs to convert the received registration optical signal into an electrical signal. In some embodiments of this application, after obtaining the processed registration optical signal, the DSP converts the processed registration optical signal into the electrical signal, referred to as the registration electrical signal herein, and sends the registration electrical signal to the MAC chip. The MAC chip may obtain effective information from the registration electrical signal, for example, a serial number of the ONU that newly goes online, and the MAC chip may complete, based on the serial number, registration for the ONU that newly goes online.

204: The MAC chip allocates, at the ONU registration stage, a first ONU identifier to the ONU that newly goes online, and sends the first ONU identifier to the DSP.

In some embodiments of this application, at the ONU registration stage, after receiving the registration electrical signal sent by the DSP, the MAC chip may allocate an identifier to the ONU that newly goes online, to obtain the first ONU identifier. In some feasible embodiments, the first ONU identifier may be an array of eight bits, for example, 110110111 or 10011110. This is not limited herein. After determining the first ONU identifier, the MAC chip may send the first ONU identifier to the DSP, and the DSP stores the first ONU identifier. In some feasible embodiments, a board further includes a rate selection RATE_SEL pin. The RATE_SEL pin is connected to the MAC chip and the DSP. The RATE_SEL pin may be used by the MAC chip to send rate information to the DSP, and send the first ONU identifier to the DSP, and may be further used to send other information in some feasible embodiments. This is not limited herein. It should be noted that the MAC chip subsequently exchanges information with the ONU that newly goes online, to complete registration of the ONU that newly goes online. Details are not described herein.

205: The DSP stores a correspondence group, where the correspondence group includes at least a correspondence between the first ONU identifier and the first reference equalization parameter.

In some embodiments of this application, after receiving the first ONU identifier, the DSP may obtain, from the equalizer, the first reference equalization parameter obtained in step 202, and then store the correspondence between the first reference equalization parameter (for example, (Cp0, Cp1, Cp2, ..., Cpn)) and the first ONU identifier (for example, 110110111). In some feasible embodiments, the correspondence may be stored in a configuration table.

As shown in Table 1, the correspondence between the first ONU identifier and the first reference equalization parameter is obtained.

TABLE 1

| ONU sequence number | ONU identifier | Reference equalization parameter |
| --- | --- | --- |
| 1 | 110110111 | (Cp0, Cp1, Cp2, ..., Cpn) |

In some feasible embodiments, the DSP may further store a plurality of correspondences, referred to as the correspondence group herein. The correspondence group includes at least the correspondence between the first ONU identifier and the first reference equalization parameter. In some feasible embodiments, the correspondence group may be stored in the configuration table.

As shown in Table 2, the configuration table stores the correspondence group, and the correspondence group includes a plurality of correspondences between ONU identifiers and reference equalization parameters.

TABLE 2

| ONU sequence number | ONU identifier | Reference equalization parameter |
| --- | --- | --- |
| 1 | 110110111 | (Cp0, Cp1, Cp2, ..., Cpn) |
| 2 | 101101110 | (Dp0, Dp1, Dp2, ..., Dpn) |
| ... | ... | ... |
| G | 110111011 | (Bp0, Bp1, Bp2, ..., Bpn) |

In some feasible embodiments, as the board registers the ONU that newly goes online, the correspondences in the correspondence group in Table 2 may be added, to gradually cover all ONUs served by the OLT. Details are not described herein.

206: The MAC chip sends first information to the DSP at an ONU online stage, where the first information includes the first ONU identifier.

In some embodiments of this application, the OLT may periodically "open the window" to register the ONU that newly goes online. After the OLT "closes the window", the ONU online stage starts. At the ONU online stage, the MAC chip is configured to serve the online ONU. It should be noted that the ONU that newly goes online described in steps 201 to 206 may be used as the online ONU at the ONU online stage to receive a service from the board (including the MAC chip, the optical module, and the like, which is not limited herein).

It should be noted that at the ONU registration stage, the MAC chip and the ONU that newly goes online may agree on an upstream transmission time for transmitting an optical signal (referred to as an optical signal herein) at the ONU online stage, so that the ONU that newly goes online may send the optical signal to the OLT at the upstream transmission time. It should be noted that the upstream transmission time may be a time period in a period (for example, a first second of each minute), a fixed time period (for example, a second corresponding to 11:09:30 on Oct. 27, 2018), or a time point (for example, 11:09:30 on Oct. 27, 2018). This is not limited herein. In some embodiments of this application, the upstream transmission time for an ONU indicated by the first ONU identifier is a first upstream transmission time.

At the ONU online stage, the MAC chip may send the first information to the DSP, where the first information includes the first ONU identifier, so that when the ONU indicated by the first ONU identifier sends an optical signal, the DSP sets the equalization parameter of the equalizer to the first reference equalization parameter. In some feasible embodiments, the MAC chip may send the first information to the DSP through the RATE_SEL pin.

In some feasible embodiments, the first information may be carried in a single frame or a plurality of frames for sending. The single frame is used as an example for description. If the first information is carried in the single frame, the first information may include an information field, and the information field may include the first ONU identifier. In some feasible embodiments, the information field may further include a check field. A check bit, also referred to as a parity bit (parity bit), is a binary number indicating whether a quantity of 1 s in a binary number with a given quantity of bits is an odd number or an even number, and is a simplest error detection code. Details are not described herein. For example, the information field may be information including 10 bits (including the check bit) of the first ONU identifier and the check bit, and the first ONU identifier may be 110110111, 101101110, or 110111011 shown in Table 2.

In some feasible embodiments, the first information further includes a demarcation field, a start field, and an end field. The demarcation field is used to be identified by the DSP. When identifying the demarcation field, the DSP may determine that a frame in which the demarcation field is located carries the first information, and may obtain the first ONU identifier from the frame.

In some embodiments of this application, content of the demarcation field may be agreed on in advance. As shown in FIG. 2-2 (which is a schematic diagram of composition of a time sequence information frame, where t is duration of transmitting one bit), the demarcation field is information of three bits, for example, 010, 110, 101, 111, or 001, or may be information of four or more bits. This is not limited herein. 010 is used as an example. The DSP may continuously search for the signal 010, and when 010 is found, the DSP determines that 010 is a demarcation field, and determines that a frame including the demarcation field carries the first information. In this case, the DSP may obtain the first ONU identifier from the frame. In some feasible embodiments, the demarcation field may alternatively be a field of four bits or another quantity of bits. This is not limited herein.

In some feasible embodiments, the start field is used to indicate that the information field starts, and the end field is used to indicate that the information field ends. In some feasible embodiments, the start field is information of four bits (or another quantity of bits, which is not limited herein), for example, 1111 (or 0000, which is not limited herein). The end field may be information of four bits (or another quantity of bits, which is not limited herein), for example, 0000 (or 1111, which is not limited herein). In some feasible embodiments, the first information may alternatively include a plurality of frames. The plurality of frames have same functions as the demarcation field, the start field, the information field, and the end field have. This is not limited herein.

207: The DSP searches the correspondence group for the first reference equalization parameter corresponding to the first ONU identifier, where the first reference equalization parameter is related to the first ONU identifier.

In some embodiments of this application, after receiving the first ONU identifier, the DSP may determine the corresponding first reference equalization parameter in the correspondence group (as shown in Table 2). For example, if the first ONU identifier is the ONU identifier 101101110 corresponding to the sequence number 2, the DSP may determine that the corresponding first reference equalization parameter is (Dp0, Dp1, Dp2, . . . , Dpn). If the first ONU identifier is the ONU identifier 110111011 corresponding to the sequence number G, the DSP may determine that the corresponding first reference equalization parameter is (Bp0, Bp1, Bp2, . . . , Bpn).

208: The DSP sets the equalization parameter of the equalizer to the first reference equalization parameter.

209: The DSP receives, within the first upstream transmission time, the optical signal sent by the ONU.

210: The DSP performs signal equalization processing on the optical signal by using the first reference equalization parameter, to obtain a processed optical signal.

In some embodiments of this application, after receiving the first information, the DSP may determine the first reference equalization parameter based on the first ONU identifier in the first information, and set the equalization parameter of the equalizer to the first reference equalization parameter. In some feasible embodiments, the first information may indicate the first upstream transmission time in two different manners.

In a first manner, after receiving the first information, the DSP immediately determines the first reference equalization parameter based on the first ONU identifier in the first information. This manner corresponds to that the MAC chip sends the first information before the first upstream transmission time, and the DSP does not store a correspondence between the first ONU identifier and the first upstream transmission time. After receiving the first information, the DSP sets the equalization parameter of the equalizer to the first reference equalization parameter, so that the optical module can receive the optical signal from the ONU at the upstream transmission time, and perform signal equalization processing on the optical signal by using the first reference equalization parameter. In this manner, after receiving the first information, the DSP obtains the first ONU identifier from the first information, determines the first reference equalization parameter based on the first ONU identifier, and may send the reset signal to the TIA, so that the optical module receives the optical signal within the first upstream transmission time through the TIA.

In a second manner, the information field included in the first information includes at least one piece of time sequence information, and the at least one piece of time sequence information includes a correspondence between an ONU identifier and an upstream transmission time. The at least one piece of time sequence information includes first time sequence information, and the first time sequence information is used to indicate a correspondence between the first ONU identifier and the first upstream transmission time. In some feasible embodiments, the first upstream transmission time is a time within which the ONU indicated by the first ONU identifier sends the optical signal to the OLT. It should be noted that the first upstream transmission time may be a time point or a time period. This is not limited herein. In this manner, after receiving the first information, the DSP obtains the first upstream transmission time corresponding to the first ONU identifier, includes the first upstream transmission time, and does not immediately set the equalization parameter of the equalizer, but sets the equalization parameter of the equalizer to the first reference equalization parameter before the first upstream transmission time, so that the optical signal is received.

In some feasible embodiments, the first information may alternatively indicate the upstream transmission time in another manner. This is not limited herein.

In some feasible embodiments, there are at least two TIAs, and the TIAs include a 50G passive optical network PON TIA and a 10G PON TIA. In some feasible embodiments, the first information further includes a rate field. The rate field is used to indicate whether to send the reset signal to the 50G PON TIA or the 10G PON TIA. After receiving the first information, the DSP may determine the rate field, and then determine, based on the rate field, whether to send the reset signal to the 10G PON TIA or the 50G PON TIA before the first upstream transmission time, so that a correct TIA can receive the optical signal.

It should be noted that the rate field may have only one bit, for example, 0 or 1. For example, 0 may indicate that a rate of the ONU is 10 Gb/s, and 1 may indicate that the rate of the ONU is 50 Gb/s; and vice versa. This is not limited herein. The rate field is used to indicate the rate (for example, 10 Gb/s or 50 Gb/s) of the ONU indicated by the first ONU identifier, so that the DSP can determine whether to reset the 10G PON TIA or the 50G PON TIA. In some feasible embodiments, if the optical module includes a plurality of TIAs for different rates, a quantity of bits of information about the rate field may be increased. For example, if the optical module includes six TIAs for different rates, the rate field may have three bits. This is not limited herein. In some feasible embodiments, in the frame that carries the first information, the rate field may be between the demarcation field and the start field, or may be between the start field and the information field, or may be between the information field and the end field. This is not limited herein.

It should be noted that in the prior art, the MAC chip may send a reset signal to the DSP of the integrated optical module through two reset (RESET) pins. One of the two reset pins is used to send the reset signal to the 10G PON TIA, and the other reset pin is used to send the reset signal to the 50G PON TIA. In some embodiments of this application, the DSP may send the reset signal to a corresponding TIA. The reset signal does not need to be sent through the two reset pins. The rate field is sent to the DSP through the RATE_SEL pin, and the DSP can send the reset signal to the correct TIA based on the rate field. In this way, the two reset pins originally used to transmit the reset signal are vacated. Therefore, in some embodiments of this application, the DSP may receive, through the two reset pins, two differential clock signals sent by the board, so that a pin does not need to be added to the board, and the board does not need to connect to an external clock chip. This implements time synchronization of each component in the OLT.

In some feasible embodiments, after obtaining the first reference equalization parameter, the DSP performs signal equalization processing on the optical signal by using the first reference equalization parameter, to obtain the processed optical signal, converts the processed optical signal into a running electrical signal, and sends the running electrical signal to the MAC chip.

In this application, the MAC chip may send the first information to the DSP, where the first information includes the first ONU identifier. The DSP may determine the related first reference equalization parameter based on the first ONU identifier, and set the equalization parameter of the equalizer to the first reference equalization parameter. Reconvergence does not need to be performed. This saves time and reduces a delay.

FIG. 3 shows an information processing method, including the following steps.

2. Set an equalization parameter of an equalizer to a second equalization parameter.

301: An optical module detects a registration optical signal at an ONU registration stage.

302: The equalizer performs convergence at the ONU registration stage to obtain a first reference equalization parameter.

303: Send a registration electrical signal to a MAC chip.

304: The MAC chip allocates, at the ONU registration stage, a first ONU identifier to an ONU that newly goes online, and sends the first ONU identifier to a DSP.

305: The DSP stores a correspondence group, where the correspondence group includes at least a correspondence between the first ONU identifier and the first reference equalization parameter.

306: The MAC chip sends first information to the DSP at an ONU online stage, where the first information includes the first ONU identifier.

307: The DSP searches the correspondence group for the first reference equalization parameter corresponding to the first ONU identifier, where the first reference equalization parameter is related to the first ONU identifier.

Steps 301 to 307 are the same as steps 201 to 207, and details are not described herein again.

308: The equalizer further performs convergence on the first reference equalization parameter to obtain the second reference equalization parameter.

309: The DSP sets the equalization parameter of the equalizer to the second reference equalization parameter.

310: The DSP receives, within the first upstream transmission time, an optical signal sent by the ONU.

311: The DSP performs signal equalization processing on the optical signal by using the first reference equalization parameter, to obtain a processed optical signal.

In some embodiments of this application, when the equalization parameter of the equalizer is set in the manner in step 309, because the first reference equalization parameter is obtained by the equalizer by performing convergence at the ONU registration stage, the first reference equalization parameter adapts to a network status at the ONU registration stage. Therefore, an appropriate equalization parameter may be recalculated. In some embodiments of this application, after the DSP obtains the first reference equalization parameter, the equalizer may further perform convergence on the first reference equalization parameter to obtain the second reference equalization parameter. The DSP is further configured to set the equalization parameter of the equalizer to the second reference equalization parameter.

The appropriate equalization parameter is related to a network status, and the network status may not change much in a short period of time. Therefore, the first reference equalization parameter is very close to the second reference equalization parameter. In comparison with convergence performed on a preset initial equalization parameter, the appropriate equalization parameter is more quickly obtained through convergence performed on the first reference equalization parameter. This improves convergence efficiency and saves time.

It should be noted that if the equalizer performs iterative convergence on the first reference equalization parameter by using the optical signal, after a first reference equalization parameter obtained after the iterative convergence is obtained, the original first reference equalization parameter in the correspondence group in a configuration table may be replaced by the first reference equalization parameter obtained after the iterative convergence, and the first reference equalization parameter obtained after the iterative convergence is paired with the corresponding first ONU identifier for storage, to update the correspondence group in the configuration table in real time to adapt to a time-varying characteristic of a channel.

In this application, the MAC chip may send the first information to the DSP, where the first information includes the first ONU identifier. The DSP may determine the related first reference equalization parameter based on the first ONU identifier, and set the equalization parameter of the equalizer to the first reference equalization parameter. Reconvergence does not need to be performed. This saves time and reduces a delay.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of the procedures or functions according to the embodiments of the present invention are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A board, wherein the board comprises:
   a media access control (MAC) chip, a digital signal processor (DSP), and an equalizer; wherein
   the MAC chip is configured to send first information to the DSP at an optical network unit (ONU) online stage, wherein the first information comprises a first ONU identifier;
   the DSP is configured to receive the first information, and determine a first reference equalization parameter, wherein the first reference equalization parameter is related to the first ONU identifier; and
   the DSP is further configured to set an equalization parameter of the equalizer to the first reference equalization parameter.

2. The board according to claim 1, wherein the first information comprises an information field, and the information field comprises the first ONU identifier.

3. The board according to claim 2, wherein the DSP is configured to set the equalization parameter of the equalizer to the first reference equalization parameter after receiving the first information and before an upstream optical signal corresponding to the first ONU identifier arrives.

4. The board according to claim 2, wherein the first information further comprises a demarcation field, a start field, and an end field.

5. The board according to claim 1, wherein the first information comprises an information field, the information field comprises at least one piece of time sequence information, the at least one piece of time sequence information comprises first time sequence information, and the first time sequence information is used to indicate a correspondence between the first ONU identifier and a first upstream transmission time.

6. The board according to claim 5, wherein the DSP is configured to determine the first reference equalization parameter corresponding to the first ONU identifier, and set the equalization parameter of the equalizer to the first reference equalization parameter before the first upstream transmission time.

7. The board according to claim 1, further comprising a rate selection (RATE_SEL) pin, wherein
   that the MAC chip sends the first information to the DSP at the ONU online stage comprises:
   sending, by the MAC chip, the first information to the DSP through the RATE_SEL pin at the ONU online stage.

8. The board according to claim 1, wherein the board further comprises a transimpedance amplifier (TIA), the DSP is connected to the TIA, and the DSP is further configured to send a reset signal to the TIA.

9. The board according to claim 8, wherein there are at least two TIAs, and the TIAs comprise a 50G passive optical network PON TIA and a 10G PON TIA.

10. The board according to claim 9, wherein the first information further comprises a rate field, and the rate field is used to indicate whether to send the reset signal to the 50G PON TIA or the 10G PON TIA.

11. The board according to claim 10, further comprising:
    two reset pins, wherein the MAC chip sends two differential clock signals to the DSP through the two reset pins.

12. The board according to claim 1, wherein
    the DSP is further configured to store a correspondence group, wherein the correspondence group comprises at least a correspondence between the first ONU identifier and the first reference equalization parameter; and
    that the DSP determines the first reference equalization parameter comprises: searching, by the DSP, the correspondence group for the first reference equalization parameter corresponding to the first ONU identifier.

13. The board according to claim 12, wherein
    the equalizer is further configured to perform convergence at an ONU registration stage to obtain the first reference equalization parameter;
    the MAC chip is further configured to allocate, at the ONU registration stage, the first ONU identifier to an ONU that is online, and send the first ONU identifier to the DSP; and
    the DSP stores the correspondence between the first ONU identifier and the first reference equalization parameter.

14. The board according to claim 1, wherein
    the equalizer is further configured to: after the DSP sets the equalization parameter of the equalizer to the first reference equalization parameter, perform convergence on the first reference equalization parameter to obtain a second reference equalization parameter; and
    the DSP is further configured to set the equalization parameter of the equalizer to the second reference equalization parameter.

15. The board according to claim 1, wherein the board further comprises an optical module, and the DSP and the equalizer are integrated in the optical module; or the DSP is integrated with the MAC chip; or the equalizer is integrated in the DSP, and the DSP is integrated in the optical module.

16. An optical line terminal (OLT), wherein the OLT comprises the board according to claim 1.

17. An information processing method, comprising:
    sending, by a MAC chip, first information to a DSP at an ONU online stage, wherein the first information comprises a first ONU identifier;

receiving, by the DSP, the first information, and determining a first reference equalization parameter, wherein the first reference equalization parameter is related to the first ONU identifier; and setting an equalization parameter of an equalizer to the first reference equalization parameter.

18. The method according to claim 17, wherein the first information comprises an information field, and the information field comprises the first ONU identifier.

19. The method according to claim 18, wherein the DSP is configured to set the equalization parameter of the equalizer to the first reference equalization parameter after receiving the first information and before an upstream optical signal corresponding to the first ONU identifier arrives.

20. The method according to claim 17, wherein the method further comprises:

storing, by the DSP, a correspondence group, wherein the correspondence group comprises at least a correspondence between the first ONU identifier and the first reference equalization parameter; and the determining, by the DSP, a first reference equalization parameter comprises:

searching, by the DSP, the correspondence group for the first reference equalization parameter corresponding to the first ONU identifier.

* * * * *